US007832288B2

(12) United States Patent
Caretta et al.

(10) Patent No.: US 7,832,288 B2
(45) Date of Patent: Nov. 16, 2010

(54) METHOD FOR DETERMINING A FORCE AT THE HUB OF A WHEEL OF A VEHICLE WHILE TRAVELING AND WHEEL SUITABLE FOR ALLOWING SAID METHOD TO BE CARRIED OUT

(75) Inventors: Renato Caretta, Milan (IT); Federico Mancosu, Milan (IT); Andrea Calatroni, Caminata (IT); Giorgio Diana, Rodano (IT); Federico Cheli, Milan (IT); Alfredo Cigada, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 310 days.

(21) Appl. No.: 11/579,318

(22) PCT Filed: May 12, 2004

(86) PCT No.: PCT/IT2004/000261

§ 371 (c)(1),
(2), (4) Date: Jan. 26, 2009

(87) PCT Pub. No.: WO2005/108945

PCT Pub. Date: Nov. 17, 2005

(65) Prior Publication Data

US 2009/0125251 A1 May 14, 2009

(51) Int. Cl.
*G01L 3/02* (2006.01)
(52) U.S. Cl. .............................. 73/862.322; 73/862.046
(58) Field of Classification Search ........ 73/146–146.8, 73/862.041–862.046, 862.322–862.33
See application file for complete search history.

(56) References Cited

U.S. PATENT DOCUMENTS 4,055,081 A * 10/1977 Honlinger ................... 73/146

FOREIGN PATENT DOCUMENTS

| EP | 0 352 788 | 1/1990 |
| WO | WO 03/008243 | 1/2003 |
| WO | WO 03/019126 | 3/2003 |

OTHER PUBLICATIONS

Loh et al., "Mehrkomponenten-Radmeßnabe—Einsatzmöglichkeiten und Ergebnisse", Automobiltechnische Zeitschrift, vol. 94, No. 1, pp. 44-46 and 49-53, (1992).

*Primary Examiner*—Max Noori
(74) *Attorney, Agent, or Firm*—Finnegan, Henderson, Farabow, Garrett & Dunner, L.L.P.

(57) ABSTRACT

A method for determining the force at the hub of a wheel of a vehicle while traveling. The wheel includes a rim and at least one deformation sensor directly associated with the rim in at least one predetermined position and arranged according to at least one predetermined orientation. The method includes the steps of detecting at least one deformation component of the rim during travel through the at least one deformation sensor; applying to the at least one deformation component, during travel, a correlation parameter characteristic of the rim, between the force at the hub and the relative deformation of the rim to determine at least one force component at the hub correlated with the at least one deformation component of the rim. The determining of the correlation parameter preferably takes place through experimental tests that include the steps of providing a sample wheel having a rim substantially the same as that of the wheel and determining at least one correlation coefficient between at least one force component acting upon the sample wheel at the hub along at least one predetermined direction and at least one respective deformation component of the rim of the wheel.

29 Claims, 7 Drawing Sheets

U.S. PATENT DOCUMENTS

| | | | |
|---|---|---|---|
| 4,448,083 A | | 5/1984 | Hayashi |
| 4,817,429 A | * | 4/1989 | Goebel ........................ 73/459 |
| 4,956,995 A | * | 9/1990 | Harrold et al. ................ 73/146 |
| 5,349,861 A | * | 9/1994 | Catot et al. .................... 73/598 |
| 5,540,108 A | * | 7/1996 | Cook et al. ............ 73/862.041 |
| 5,827,956 A | * | 10/1998 | Beste et al. ................... 73/146 |
| 5,894,094 A | * | 4/1999 | Kuchler et al. ......... 73/862.044 |
| 6,523,408 B1 | * | 2/2003 | Colarelli et al. ............... 73/460 |
| 6,681,646 B1 | | 1/2004 | Bacher et al. |
| 6,959,593 B2 | * | 11/2005 | Mancosu et al. .............. 73/146 |
| 2002/0059837 A1 | | 5/2002 | Meyer et al. |
| 2003/0058118 A1 | | 3/2003 | Wilson |
| 2006/0037409 A1 | * | 2/2006 | Ichige ........................ 73/862 |
| 2006/0054424 A1 | * | 3/2006 | Inoue et al. ................ 188/18 R |

* cited by examiner

FIG. 8 — MEASURE / ESTIMATE

FIG. 9 — MEASURE / ESTIMATE

METHOD FOR DETERMINING A FORCE AT THE HUB OF A WHEEL OF A VEHICLE WHILE TRAVELING AND WHEEL SUITABLE FOR ALLOWING SAID METHOD TO BE CARRIED OUT

CROSS REFERENCE TO RELATED APPLICATION

This application is a national phase application based on PCT/IT2004/000261, filed May 12, 2004, the content of which is incorporated herein by reference.

BACKGROUND OF THE INVENTION

1. Field of the Invention

The present invention relates to a method for determining a force at the hub of a wheel of a vehicle whilst traveling. More specifically, the invention relates to a method for measuring the forces at the hub generated by the wheel-road contact forces acting on the pneumatic tyre of a vehicle wheel whilst traveling. The invention also relates to a wheel for vehicles suitable for allowing said method to be carried out.

2. Description of the Related Art

Throughout the present description and in the subsequent claims, the expression: wheel-road contact forces, is used to indicate the stresses applied on the wheel by the road surface (or by a device which simulates the road surface, such as a rolling runway of a drum simulating the road surface). Such stresses include, for example, the vertical and/or longitudinal and/or lateral forces acting locally on the pneumatic tyre and/or the moments generated by such forces.

As known, in the field of the vehicle dynamic control, a substantial part of the research has as a primary purpose that of allowing the real time monitoring of the behavior of wheels whilst they are traveling. This is in order to contribute to ensuring dynamic control of the vehicle in the different conditions of use, for such a purpose suitably adjusting possible safety and/or comfort devices foreseen on the vehicle, such as ABS (Anti Block System), VDC (Vehicle Dynamic Control), suspension adjustment devices, steering adjustment devices, power adjustment devices and transmission adjustment devices. The real time monitoring of the wheels can also be useful for identifying the causes of accidents or other diagnostic and/or precautionary purposes.

For such a purpose, wheels and vehicles can be equipped with devices capable of detecting in real time information relative to the current dynamic conditions of the wheel whilst traveling. Such information is used on the same vehicle to suitably adjust the aforementioned safety and/or comfort devices so as to contribute to ensuring that the driver has the control of the vehicle in those specific conditions of use. The aforementioned information can also be stored or sent telematically to a remote control station to carry out a diagnostic analysis of the wheel.

Amongst the information considered of interest for achieving the aforementioned purposes there are those linked to the magnitude and distribution of the stresses applied by the road surface on the pneumatic tyre and the deformations of the wheels under a load.

For example, the information relative to the stresses acting on each pneumatic tyre and transmitted to the hub can be used to suitably adjust the braking force on each pneumatic tyre (for example through ABS). Such information can also be used to determine the dynamic stability of the vehicle and thus suitably adjusting the steering, when it is used to control the lateral dynamics. Moreover, such information can also be used to adjust the rigidity and behavior of the suspension system acting on each pneumatic tyre.

Devices and methods for the real time monitoring of the wheels of a vehicle through detection of the deformations of the rim due to stresses applied by the road surface to the pneumatic tyre are known.

For example, US 2003/0058118 A1 discloses a system for monitoring a pneumatic tyre of a vehicle, in which the deformation of a pneumatic tyre under a load is detected to obtain information linked to such a deformation, such as the load on the pneumatic tyre, the total mass of the vehicle and the mass distribution of the vehicle. The deformation of the pneumatic tyre is detected through detection of the variations in acceleration of the pneumatic tyre in rotation (by means of an acceleration sensor mounted on the pneumatic tyre, preferably on an inner surface of the tread) and generation of electric signals representing the variations in acceleration at the wheel-road contact zone. The Applicant has noted that the actuation of the method described in such a document requires the arrangement of an acceleration sensor inside the pneumatic tyre. Therefore, this is a detection system that is invasive on the pneumatic tyre and that thus necessarily provides useful results only for that specific pneumatic tyre on which the acceleration sensor is installed. Such a system also involves technical complications in the assembly of the wheel, whereas the addition of mass to the pneumatic tyre implies greater problems of uniformity, or else less comfort associated with irregular and greater wear.

Different devices and methods are known that foresee a measurement of the wheel-road contact forces through the use of strain gauges mounted on the wheel in positions other than the pneumatic tyre.

For example WO 03/008243 discloses a device for detecting the forces acting on a pneumatic tyre, such a device comprising a disc intended to be mounted between the hub and the rim of the wheel and provided with a plurality of strain gauges suitable for detecting the forces acting on the pneumatic tyre, and a detection portion suitable for determining an abnormality in the detection of the forces acting on the pneumatic tyre to allow a subsequent correction of such an abnormality.

U.S. Pat. No. 6,681,646 discloses a device for detecting the deformations of a wheel for a vehicle comprising a substantially annular element placed between the hub and the rim of the wheel and on which a plurality of strain gauges suitable for detecting the forces acting upon the pneumatic tyre are mounted.

The Applicant has noted that the devices described in the two prior art documents discussed above require the arrangement in the wheel of additional rotating masses on which the strain gauges are to be mounted. From this derives a technical complication in the assembly operations of the wheel, a significant increase in the overall weight of the wheel and an alteration of the dynamic behavior of the wheel itself.

The Applicant has considered the problem of determining in real time the forces at the hub of a wheel of a vehicle generated by the wheel-road contact stresses acting whilst traveling through a system for detecting deformations which, as well as allowing, through suitable algorithms, a reliable measurement of the actual stresses/forces at the hub generated by the contact between pneumatic tyre and road surface in the different conditions of use to be obtained, is non-invasive on the pneumatic tyre (so as to make the method able to be carried out irrespective of the specific type of pneumatic tyre mounted on the rim) and does not involve a significant increase in the overall weight of the wheel nor an alteration of the dynamic behavior of the wheel itself. The Applicant has thus verified that such a problem is solved by associating at least one deformation sensor directly on the rim of the wheel in at least one predetermined position and according to at least one predetermined orientation, so as to be able to detect, during travel, at least one deformation component of the rim of the wheel and then apply to said at least one deformation component a correlation parameter characteristic of that specific rim.

SUMMARY OF THE INVENTION

The present invention therefore relates, in a first aspect thereof, to a method for determining a force at the hub of a wheel of a vehicle whilst traveling, said wheel comprising a rim, a pneumatic tyre mounted on said rim and at least one deformation sensor directly associated with said rim in at least one predetermined position and arranged according to at least one predetermined orientation, the method comprising the steps of:

detecting during travel at least one deformation component of said rim through said at least one deformation sensor;
 applying to said at least one deformation component, during travel, a correlation parameter, characteristic of said rim, between the force at the hub and the relative deformation of said rim to determine at least one force component at the hub correlated with said at least one deformation component of said rim.

Throughout the present description and in the subsequent claims, the expression: deformation sensor, is used to indicate any device capable of detecting any characteristic magnitude that is representative of a deformation of the rim on which the sensor is mounted. For example, detection devices suitable for carrying out the method of the present invention are: strain gauges, accelerometer, membrane sensors (for example sensors based upon SAW technology), optical sensors, pressure sensors, sensors that vary their magnetic properties as the stresses to which they are subjected vary, and the like.

The expression: relative deformations, or respective deformations, on the other hand, is used in the rest of the present description and in the subsequent claims to indicate specific deformations, or specific deformation components, caused by specific forces, or by specific force components.

The method of the present invention therefore advantageously requires the arrangement of a wheel comprising at least one deformation sensor directly associated with the rim of the wheel (for example housed in suitable recesses formed on the rim or embedded in the rim at the melting step or housed in suitable manufactured products in turn included in the rim). In other words, it is a wheel provided with a system for detecting the deformations that, unlike the systems discussed above with reference to the prior art, is not invasive on the pneumatic tyre. Since the system for detecting the deformations of the wheel of the present invention does not require any significant rotating mass added to the wheel, it does not involve an increase in the overall weight of the wheel, nor an alteration of the dynamic behavior of the wheel itself. It follows that a simplification of the assembly operations of the wheel is achieved.

The correlation parameter used in the method of the present invention is a force-deformation correlation parameter characteristic of that specific rim of the wheel of which one wishes to known the forces at the hub generated during travel by the wheel-road contact forces. Therefore, the application of such a correlation parameter to the deformations detected in real time on the rim of the wheel during travel allows the forces at the hub generated by the wheel-road contact forces acting during travel on the pneumatic tyre and effectively responsible for those deformations detected through the sensors to be determined. Assuming that the relation between deformations of the rim and forces at the hub is linear, it follows that:

$$\underline{F} = [A] \cdot \underline{\epsilon}$$

where $\underline{F}$ is the force at the hub, $[A]$ is the correlation parameter and $\underline{\epsilon}$ is the deformation caused by the force F. The application of the correlation parameter $[A]$ to the deformations $\underline{\epsilon}$ thus allows the forces $\underline{F}$ to be obtained.

The position, the orientation and the number of deformation sensors on the rim can vary according to the specific requirements and/or needs. In particular, in the case in which one wished to measure just one specific force component at the hub, for example just the longitudinal force component Fx, or just the lateral force component Fy or just the vertical force component Fz, it is sufficient to apply just one strain gauge onto the rim in an appropriate position and according to an appropriate orientation; the correlation parameter $[A]$, in such a case, shall assume the form of a vector. On the other hand, in the case in which one wished to measure more than one force component at the hub, for example the three components Fx, Fy and Fz defined above, it is necessary to apply at least three strain gauges to the rim; in such a case $\underline{F}$ and $\underline{\epsilon}$ shall be vectors and the correlation parameter $[A]$ shall assume the form of a matrix.

Preferably, the correlation parameter is obtained through the execution of experimental tests on the wheel itself (or, preferably on a wheel analogous to that) for which one wishes to know the forces at the hub during travel. Such experimental tests consist of simulating in a laboratory the stresses applied by the road surface on the pneumatic tyre of the wheel during travel (as at least one test parameter is varied, such as the drift angle, camber angle, vertical force applied, pneumatic tyre pressure, slidding of the pneumatic tyre (when braking), speed of the wheel) and detecting the respective deformations of the rim of the wheel to then determine the force-deformation correlation parameter characteristic of that specific rim on which the experimental tests have been carried out.

More preferably, the determination of the correlation comprises the steps of:

a) providing a sample wheel having a rim which is substantially the same as the rim of said wheel;

b) determining, through experimental tests on said sample wheel, at least one correlation coefficient between at least one force component acting upon said sample wheel at the hub along at least one predetermined direction and at least one respective deformation component of the rim of said sample wheel.

Throughout the present invention and in the subsequent claims, the expression: sample wheel, is used to indicate a wheel provided with a rim identical to the rim of the wheel for which one wishes to measure the forces at the hub during travel, equipped with any pneumatic tyre, and having the same type, equal number and analogous arrangement and orientation of sensors with respect to the aforementioned wheel.

Preferably, the step of determining said at least one correlation coefficient comprises the steps of:

a1) setting said correlation coefficient at an initial value;

a2) applying at least one test parameter to said sample wheel;

a3) applying at least one force component acting upon the sample wheel at the hub along said at least one predetermined direction;

a4) detecting at least one deformation component of the rim of said sample wheel, caused by said at least one force component;

a5) multiplying said at least one correlation coefficient and said at least one deformation component detected in step a4) to obtain at least one calculated force component;

a6) comparing said at least one force component calculated in step a5) with said at least one force component applied in step a3);

a7) iteratively repeating steps a5) and a6) each time correcting the value of said at least one correlation coefficient until said at least one force component calculated in step a5) assumes a value substantially equal, apart from a predetermined tolerance, to that of said at least one force component applied in step a3).

The correlation parameter is thus obtained by carrying out experimental tests on a conventional testing device provided with a suitable equipped hub on which the sample wheel is to be mounted, with a rolling runway suitable for simulating the road surface (for example a flat belt), with a stressing member suitable for applying a predetermined force to the sample wheel according to a predetermined direction and with a device for measuring the force components exchanged, following the application of the load, between hub and sample wheel that rolls on said flat belt (hereafter such forces are also indicated as forces at the hub). The comparison between forces determined at the hub and forces applied at the hub and the continuous correction of the correlation parameter until the forces determined at the hub are equal, apart from a predetermined tolerance, to the forces applied at the hub then allows identification, by a optimisation process, of that particular correlation parameter between forces at the hub and respective deformations which is characteristic of that particular rim.

Preferably, in a preferred embodiment of the method of the present invention, the correction of said at least one correlation coefficient takes place through an error minimization algorithm between said at least one force component calculated in step a5) and said at least one force component applied in step a3). However, it is possible to use other conventional calculation algorithms.

Preferably, said at least one deformation sensor is directly associated with the rim of said wheel at at least one zone of maximum deformation of said rim in a determined direction. The optimal points of the rim are thus identified on which the deformation sensors are to be positioned in various ways in order to make easier and optimise the detection of the deformations of the rim. The zone of maximum concentration of deformation, for example, can be identified through a finite elements analysis of the rim itself.

Preferably, said at least one deformation sensor is a strain gauge. Such a sensor is, indeed, known to allow an efficient and effective detection of the local deformations of any metal body.

In a variant of the method of the present invention, said at least one deformation sensor is a membrane sensor. For example, said at least one deformation sensor is a membrane sensor preferably based upon SAW technology. This are sensors having a rigidity, and consequently a resonance frequency, which varies as the stresses to which they are subjected varies. Such sensors, although more sophisticated and delicate than strain gauges, have the advantage with respect to the latter of not requiring the presence of an electric power source on the wheel.

It is also possible to use sensors based upon materials that have a variation in their magnetic properties as the stress to which they are subjected varies. The variation in magnetic properties is usually measured through a variation in inductance.

However, in the actuation of the method of the present invention it is possible to use other conventional sensors, such as accelerometers, magnetic sensors and optical sensors, provided that they are able to allow the acquisition of information representing the local deformations of the rim of the wheel under a load during the rolling of the wheel itself.

Preferably, said wheel comprises at least three deformation sensors suitably positioned in different points of the wheel so as to detect at least three local deformation components of the rim generated by the force acting at the wheel-road contact zone.

In the preferred embodiment of the method of the present invention, the deformation sensors associated with the wheel are four in number, so as to always ensure the presence of at least three active sensors even in the case in which one fails.

Preferably, the method of the present invention also comprises the steps of:
 generating at least one control signal representing said at least one force component determined at the hub during travel;
 processing said at least one control signal to determine data representing the dynamic conditions of the wheel during travel;
 sending said data to a vehicle control unit.

Advantageously, the data representing the dynamic conditions of the wheel during travel is used on the same vehicle to suitably adjust the aforementioned safety and/or comfort devices so as to contribute to ensuring that the driver has the control of the vehicle in the different conditions of use. The aforementioned data can also be stored or sent telematically to a remote control station to carry out a diagnostic analysis of the wheel.

The processing step of said at least one control signal is preferably carried out by a signal processing unit mounted on said wheel or, according to a variant of the method of the present invention, inside the vehicle.

The control unit can be mounted inside the vehicle or in a remote position with respect to the vehicle. For example, the control unit is provided inside the vehicle when one wishes to carry out the adjustment of the possible safety and/or comfort devices associated with the wheel, whereas it can be provided in a remote position with respect to the vehicle when one wishes to store the data to subsequently carry out a diagnostic analysis of the wheel.

In the case in which one wishes to contribute to the adjustment of the possible safety and/or comfort devices associated with the wheel, the method of the present invention comprises the steps of:
 processing said data in said vehicle control unit to generate a command signal representing optimal dynamic conditions of said wheel during travel;
 controlling the dynamic behavior of the vehicle modifying, based upon said command signal, at least one travel parameter applied to said wheel. Such a travel parameter is, for example, the drift angle, the camber angle, the vertical force applied, the pneumatic tyre pressure, the sliding of the pneumatic tyre (when braking), the speed of the wheel.

The actuation of the method of the present invention requires the presence of a power source for the operation of the deformation sensors (in the case of strain gauges) and for the data processing and transmission. Such a power source, per sé conventional, can be mounted inside the wheel (in the case in which the wheel comprises possible devices requiring a power supply, like strain gauges and processing units of the control signal) or, alternatively, inside the vehicle (in the case in which deformation sensors are used that do not require a power supply and the processing unit of the control signal is foreseen inside the vehicle). In the latter case, the transmission of the power supply to the wheel takes place by radio frequency.

In a second aspect thereof, the present invention relates to a wheel for vehicles comprising a rim and a pneumatic tyre mounted on said rim, in which said wheel comprises at least one deformation sensor directly associated with said rim in at least one predetermined position and arranged according to at least one predetermined orientation.

Such a wheel allows the method of the present invention discussed above to be carried out and thus has, at least in part, the same advantageous characteristics highlighted above with reference to such a method. In particular, with such a wheel the drawbacks encountered in the wheels of the prior art previously discussed (invasiveness on the pneumatic tyre, significant increase in overall weight, alteration of the dynamic conditions and complications in the assembly operations) are overcome.

Preferably, said at least one deformation sensor is associated with said rim in at least one zone of maximum deformation of said rim in a determined direction.

In a first preferred embodiment of the wheel of the present invention, said at least one deformation sensor is a strain gauge. In a variant thereof, said at least one deformation sensor is a membrane sensor having a rigidity, and consequently a resonance frequency, which varies as the stresses to which the membrane is subjected vary.

In the preferred embodiment of the wheel of the present invention, the wheel comprises at least three deformation sensors suitably positioned in different points of the wheel so as to detect at least three local deformation components of the wheel generated by the force acting at the wheel-road contact zone. Even more preferably, the wheel comprises four sensors.

In an embodiment thereof, the wheel of the present invention also comprises a processing unit of a control signal representing at least one force component at the hub.

Preferably, the wheel of the present invention also comprises a power source.

BRIEF DESCRIPTION OF THE DRAWINGS

Further characteristics and advantages of the present invention shall become clearer from the following detailed description of some embodiments thereof, made with reference to the attached drawings. In such drawings.

DETAILED DESCRIPTION OF THE DRAWINGS

Figure 1:
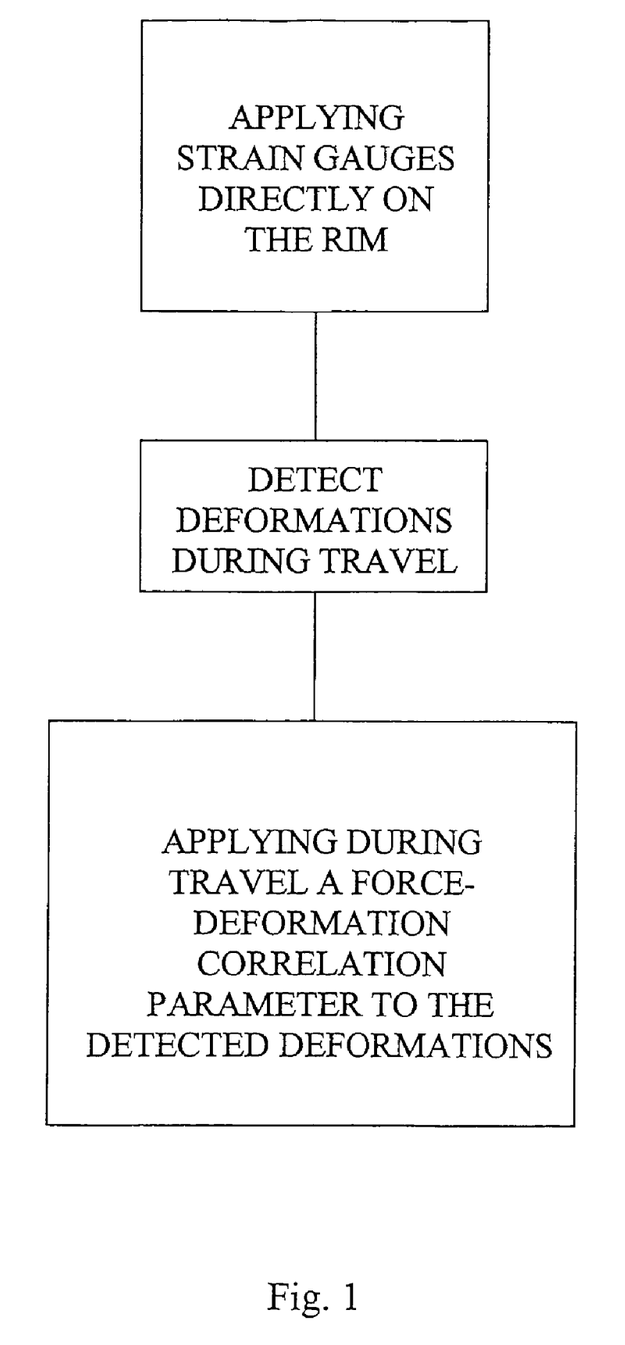
FIG. 1 shows a block diagram of the method of the present invention in its most general embodiment.

In FIG. 1 the main steps of an embodiment of a method for measuring the forces at the hub in a wheel of a vehicle whilst traveling, in accordance with the present invention, are shown.

The actuation of such a method firstly comprises a step of arranging, directly on the rim of the wheel and in predetermined positions, a plurality of deformation sensors suitably orientated so as to be able to detect a plurality of deformation components during travel. Preferably, the aforementioned predetermined positions are identified in an optimal manner by using simulation techniques, for example the technique of finite elements analysis.

In accordance with the method of the present invention, the forces at the hub generated by the wheel-road contact forces acting on the pneumatic tyre of the wheel during travel are determined by detecting the deformations during travel of the rim through the aforementioned deformation sensors and applying to said deformations an appropriate correlation parameter between forces at the hub and respective deformations (see FIG. 1).

The correlation parameter is a characteristic parameter of the rim in question and the application of such a parameter to the deformations detected during travel on that rim allows the determination of the force components at the hub actually present and generated by the wheel-road contact forces acting on the wheel and responsible for those deformations detected by the sensors. For such a purpose it can be assumed that the relation between deformations of the rim and forces at the hub is linear, that is:

$$\underline{F} = [A] \cdot \underline{\epsilon}$$

where $\underline{F}$ is the force at the hub, $[A]$ is the correlation parameter and $\underline{\epsilon}$ is the deformation caused by the force F. The application of the correlation parameter $[A]$ to the deformations $\underline{\epsilon}$ thus allows the forces $\underline{F}$ to be obtained.

Hereafter, explicit reference shall be made to the case in which one wishes to measure three perpendicular components Fx, Fy and Fz of the force at the hub, where Fx is the longitudinal force component (that is the force component along the rolling direction of the pneumatic tyre), Fy is the lateral force component (that is the force component along the axis of the hub of the wheel) and Fz is the vertical force component. In such a case, the rim of the wheel is equipped with at least three deformation sensors; in such a case $\underline{F}$ and $\underline{\epsilon}$ shall be vectors and the correlation parameter $[A]$ shall assume the form of a 3×3 matrix formed of 9 correlation coefficients.

In the preferred embodiment of the wheel of the present invention, there are four sensors. The sensors are also associated with the rim at respective zones of maximum deformation of the rim along directions x, y and z. Such zones of maximum concentration of deformation are identified, for example, by carrying out a finite elements analysis on the rim, as stated previously.

The correlation matrix is obtained through the execution of experimental tests on a sample wheel, that is on a wheel provided with a rim identical to that of the wheel for which one wishes to measure the forces at the hub during travel, and having the same type, equal number and analogous arrangement and orientation of sensors with respect to the aforementioned wheel. To determine the various coefficients a series of tests are carried out in which various test parameters are varied in turn, or simultaneously, for example drift angle, camber angle, vertical force applied, pneumatic tyre pressure, sliding of the pneumatic tyre (when braking), speed of the wheel.

Figure 2:
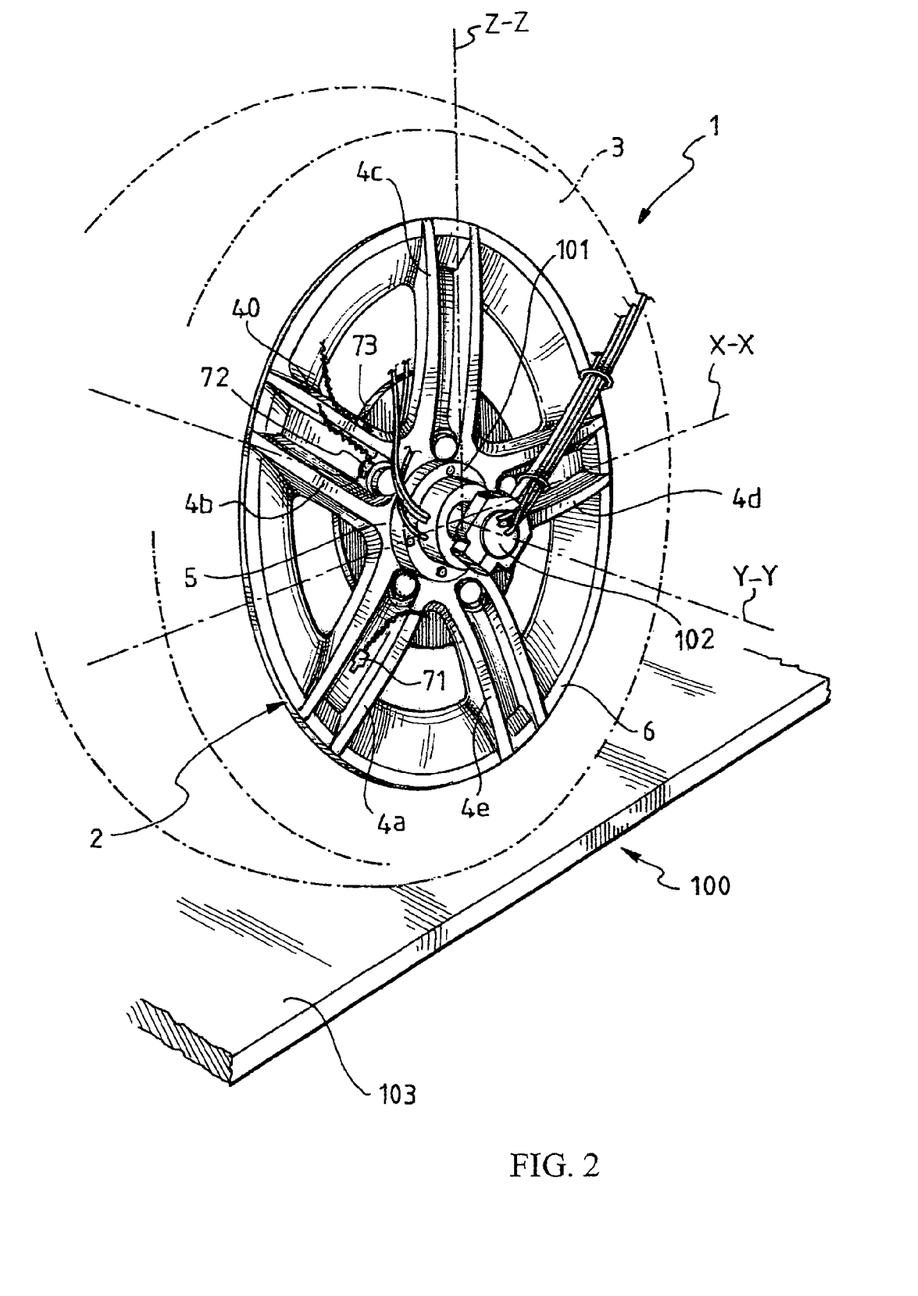
FIG. 2 shows a schematic perspective view of an embodiment of a sample wheel used in a preferred embodiment of the method of the present invention.

FIG. 2 shows a schematic example embodiment of a sample wheel, generically indicated with 1, and of a device 100, per sé conventional, for carrying out the aforementioned experimental tests.

The sample wheel 1 of FIG. 2 comprises a rim 2 on which a pneumatic tyre 3 is mounted. The rim 2, in particular, has a plurality of spokes, indicated with 4a, 4b, 4c, 4d and 4e, a central annular portion 5 for attachment to a hub and a peripheral annular portion 6 for attachment to the pneumatic tyre 3. Of course, the specific shape of the rim, the presence or not of spokes and possibly the number of such spokes has absolutely no influence for the purposes of the actuation of the method of the present invention; what is important is that the rim 2 of the sample wheel 1 on which the experimental tests are carried out is identical (also taking into account the presence of the deformation sensors) to that of the wheel for which one wishes to measure the forces at the hub during travel.

The position, the number and the orientation of the deformation sensors on the rim 2 can vary according to the specific requirements. The example sample wheel illustrated in FIG. 2 comprises three deformation sensors directly associated with the rim 2; such a wheel allows, for example, the detection of three deformation components of the rim associated with the three perpendicular components Fx, Fy and Fz identified above.

In the sample wheel illustrated in FIG. 2, the sensors are positioned in the following way:
   a first sensor 71 is mounted on the front surface of the spoke 4a in a position and with an orientation such as to allow the detection of the deformation of the rim 2 by flexing in the plane perpendicular to the middle plane X-Z of the wheel 1 (such a deformation is substantially caused by the combined action of the force components Fy and Fz);
   a second sensor 72 is mounted on the annular portion 5 for attachment to the hub at the spoke 4b in a position and with an orientation such as to allow the detection of the circumferential deformation of the rim 2 (such a deformation is substantially caused by the action of the force component Fy);
   a third sensor 73 is mounted on a side rib 40 of the spoke 4b in a position and with an orientation such as to allow the detection of a deformation of the rim 2 by flexing in a plane parallel to the middle plane X-Z of the wheel 1 (such a deformation is substantially caused by the action of the force component Fx).

As illustrated in FIG. 2, the device 100 for carrying out the experimental tests for determining the correlation matrix comprises a hub 101 on which the sample wheel 1 is mounted and a member 102 acting on the hub 101 to apply a predetermined force to the sample wheel 1, through the hub 101, along a predetermined direction. The test device 100 also comprises a rolling runway 103 suitable for simulating the road surface and a force measuring device (not illustrated) suitable for measuring the components of the force applied (previously applied to the hub of the sample wheel 1).

The determining of the coefficients of the correlation matrix takes place in the following way: once the sample wheel 1 has been mounted on the hub 101 and at least one test parameter to be applied to the wheel has been selected (for example drift angle, camber angle, vertical force applied, pneumatic tyre pressure, sliding of the pneumatic tyre, speed of the wheel) the wheel is stressed with a predetermined force at the hub. The force components Fx, Fy and Fz acting upon the hub of the sample wheel 1 along the three perpendicular directions x-x, y-y and z-z following the application of the predetermined force are measured through the force measuring device, whereas the three deformation components caused by said three force components are measured through the sensors 71, 72 and 73. Then the coefficients of the correlation matrix are initially set at predetermined random values and three force components are calculated by applying the correlation matrix to the deformation components detected by the sensors. Then these calculated force components are compared with the force components applied at the hub and measured by the force measuring device and the aforementioned steps of calculation of the force components and of comparing these calculated components with those applied and measured by the force measuring device, each time correcting the value of the coefficients of the correlation matrix through an appropriate algorithm. The continuous process is interrupted as soon as the values of the calculated force components equal, apart from a predetermined tolerance, the values of the force components applied to the hub.

The correction of the coefficients of the correlation matrix preferably takes place through an error minimization algorithm between the calculated force components and the force components applied at the hub (and measured).

The correlation matrix between forces at the hub and respective deformations is thus determined experimentally. Such a matrix allows, once the deformation components detected by the sensors of the wheel during travel are known, the force components at the hub, that are substantially equal, apart from the predetermined tolerance, to the components at the hub actually acting on the wheel, to be determined.

In practice, the correlation parameter, that is in the case illustrated above the matrix [A], through its own coefficients, decouples the forces acting upon the hub during travel according to the aforementioned three axes.

Figure 3:
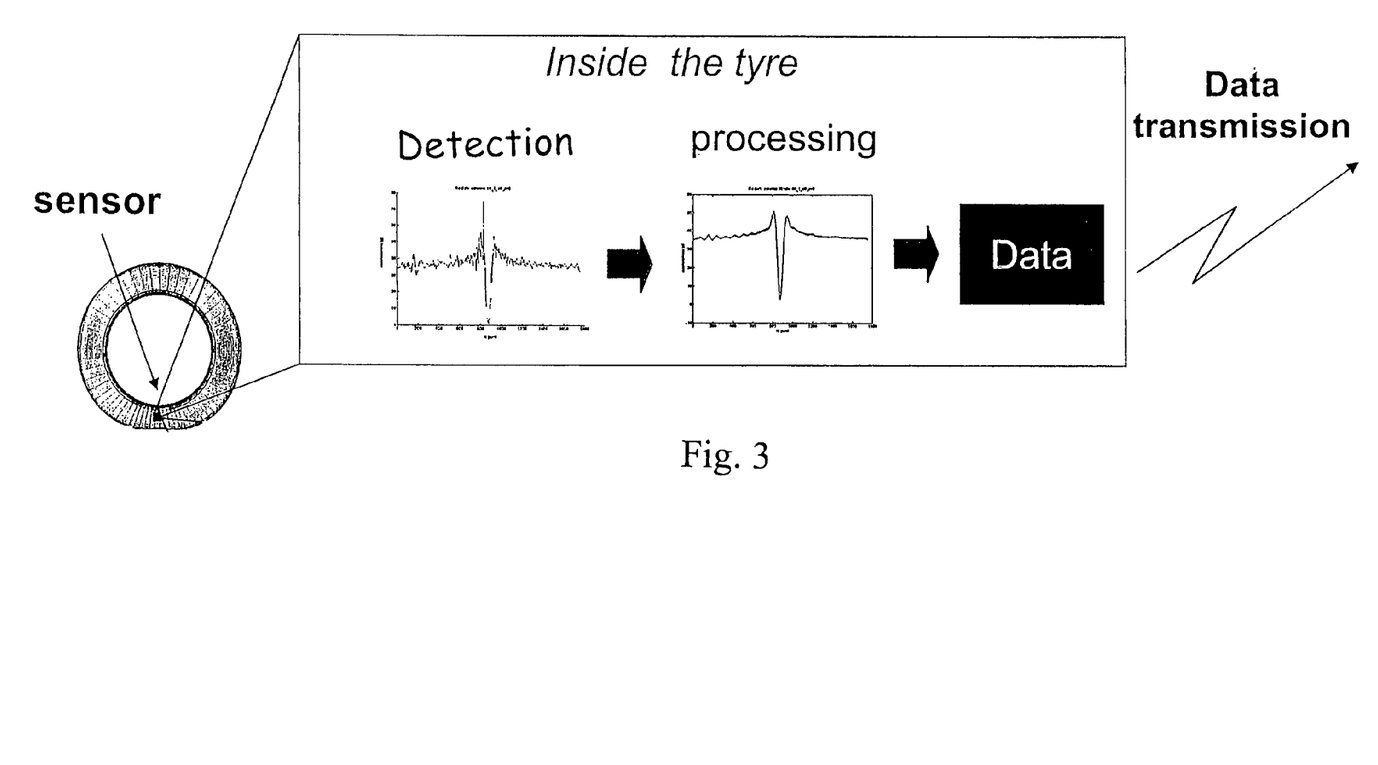
FIG. 3 shows an example diagram of a first embodiment of the method of the present invention.
Figure 4:
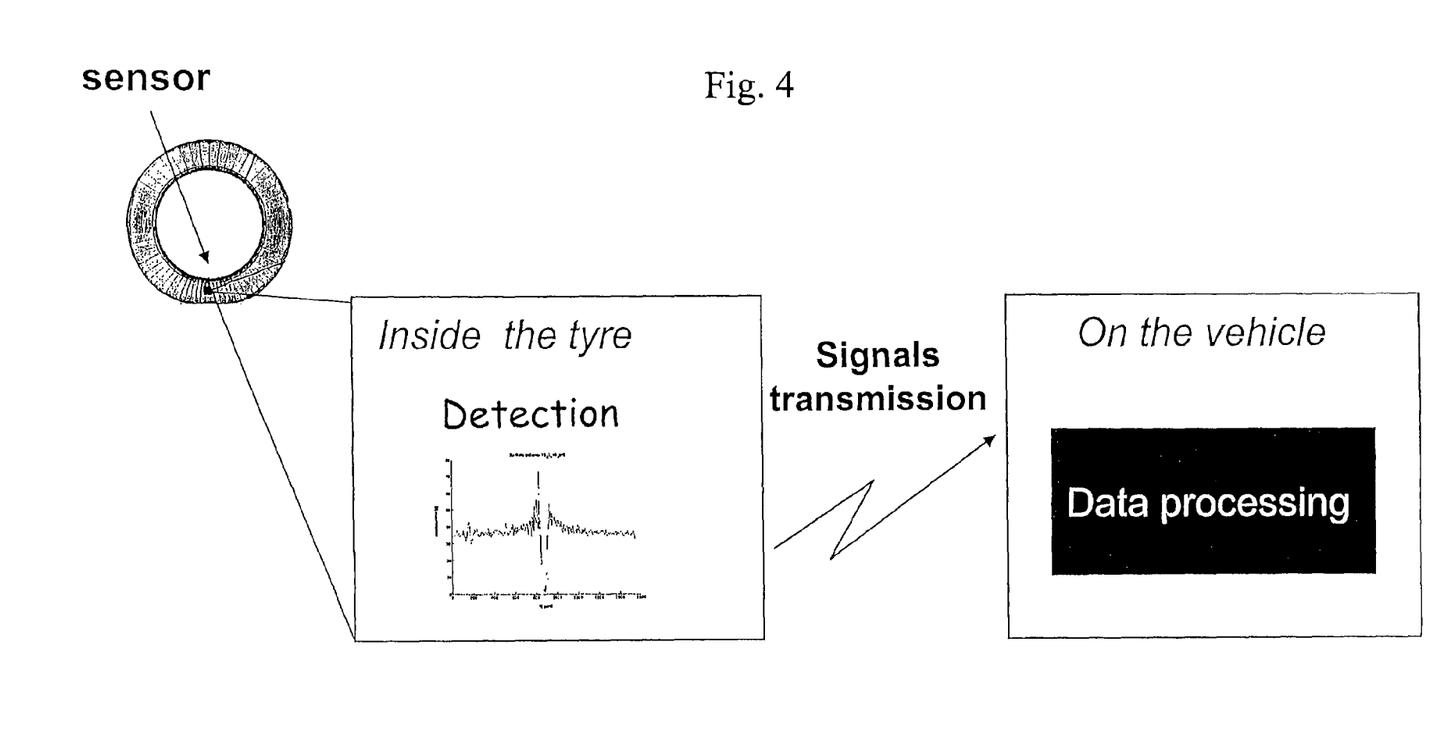
FIG. 4 shows an example diagram of a second embodiment of the method of the present invention.

In the preferred embodiment of the method of the present invention, once the forces at the hub acting upon the wheel during travel have been calculated, a control signal representing said forces is generated. Such a signal is sampled and then sent to a suitable processing unit where it is processed to determine the data representing the dynamic conditions (forces at the hub in the three directions) of the wheel during travel. The processing unit of the signal can be mounted inside the wheel (as illustrated in FIG. 3) or inside the vehicle (as illustrated in FIG. 4). In the first case the wheel shall be provided with a suitable data transmission antenna (as well as an appropriate electrical power supply system, if necessary) and the vehicle shall be provided with a suitable data receiving antenna.

Figure 5:
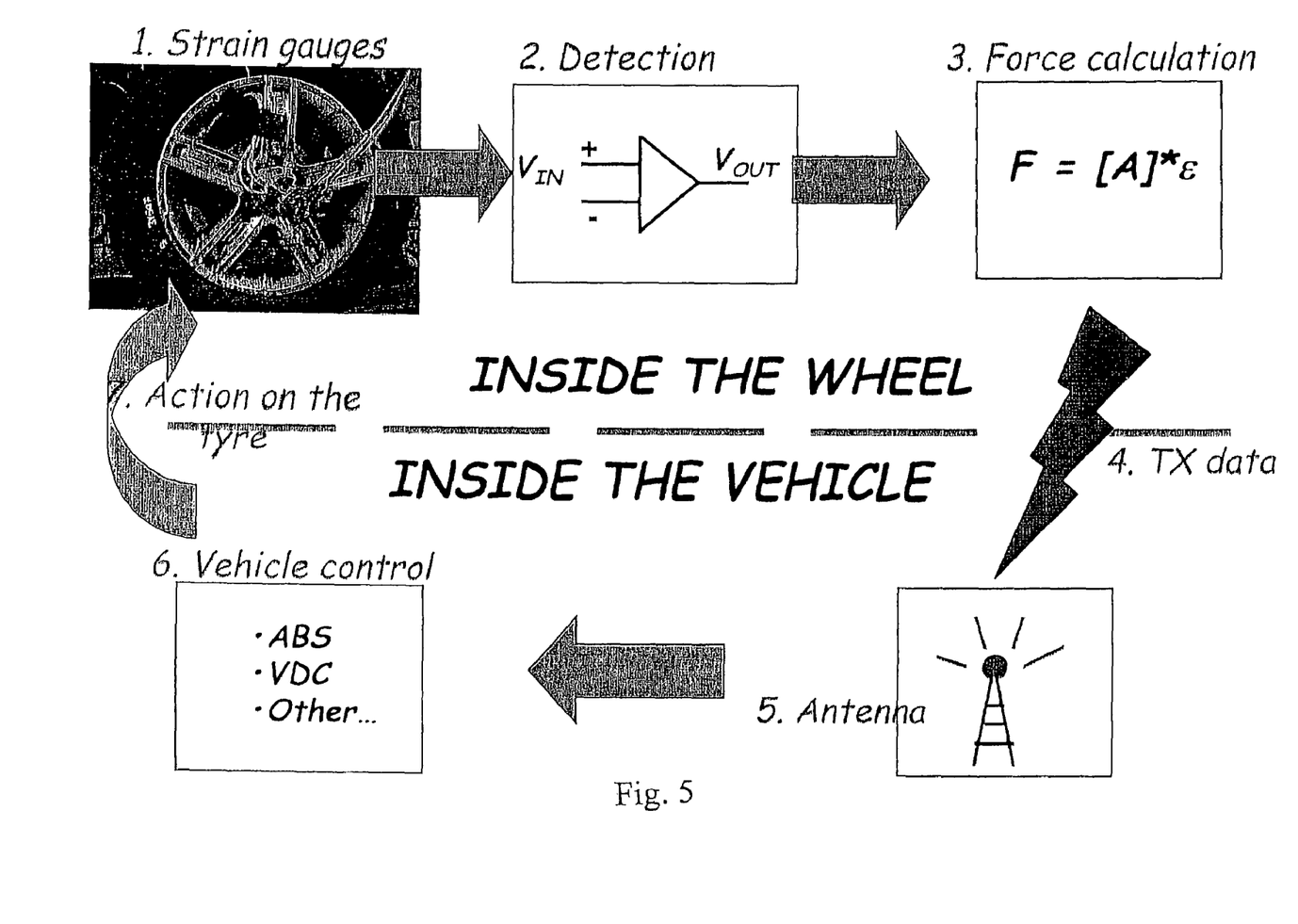
FIG. 5 shows an example diagram of an embodiment of the method of the present invention for controlling the dynamic behavior of the wheel.
Figure 6:
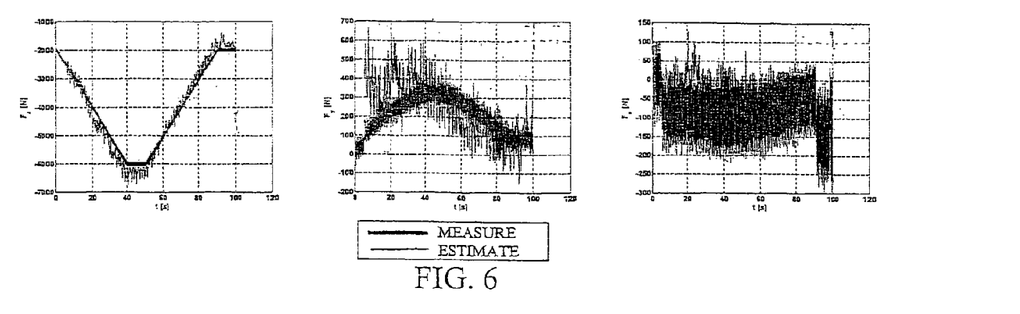
FIG. 6 shows the results obtained by the Applicant in an experimental test on the sample wheel of FIG. 2 with variation of vertical load from 2000 N to 6000 N at 50 km/h, and zero drift, sliding and camber.
Figure 7:
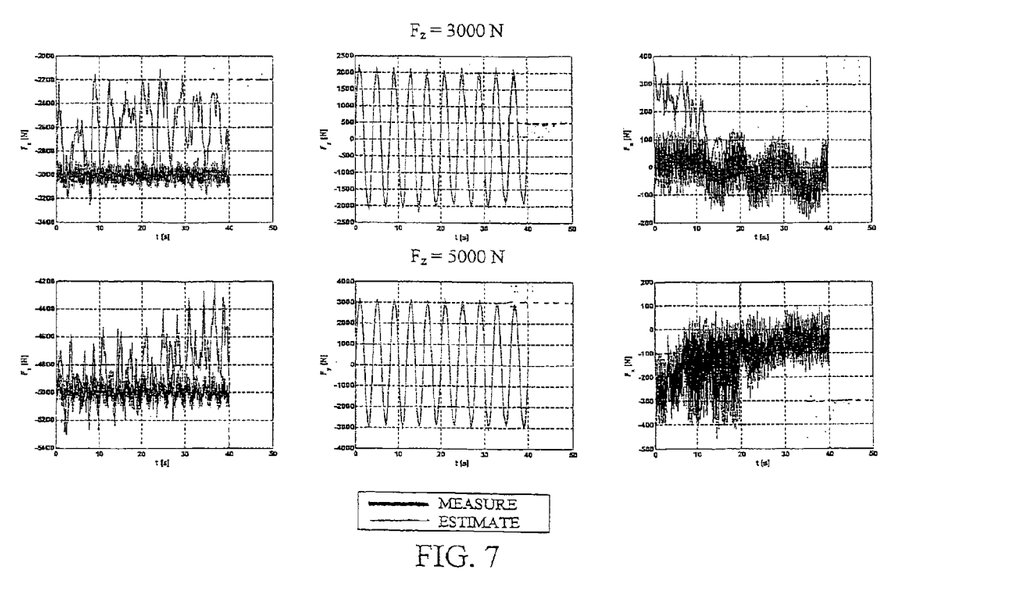
FIG. 7 shows the results obtained by the Applicant in an experimental test on the sample wheel of FIG. 2 with sinusoidal variation of drift (magnitude 2°, frequency 0.25 Hz) at 50 Km/h, 3000 and 5000 N vertical load and zero sliding and camber.
Figure 8:
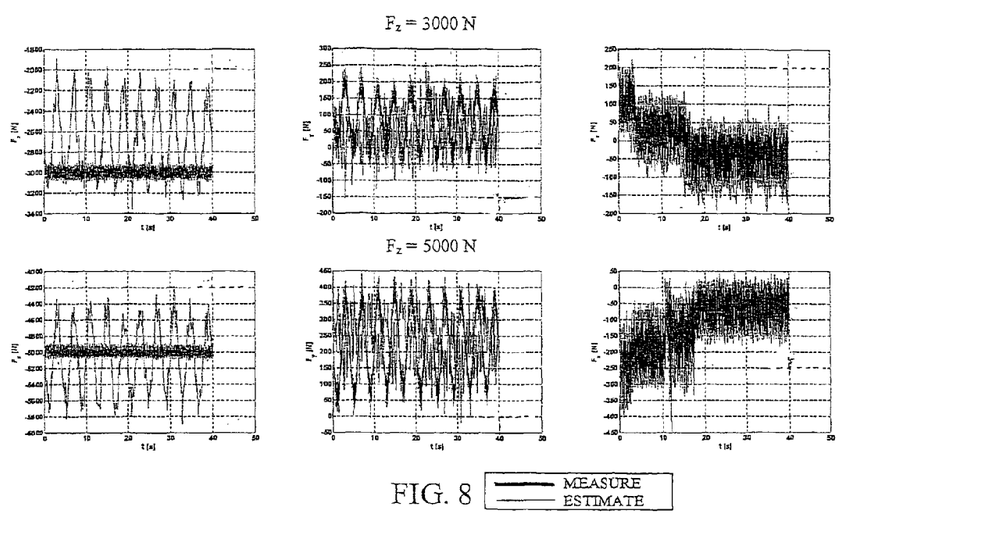
FIG. 8 shows the results obtained by the Applicant in an experimental test on the sample wheel of FIG. 2 with sinusoidal variation of camber (magnitude 2°, frequency 0.25 Hz) at 50 Km/h, 3000 and 5000 N vertical load and zero sliding and drift.
Figure 9:
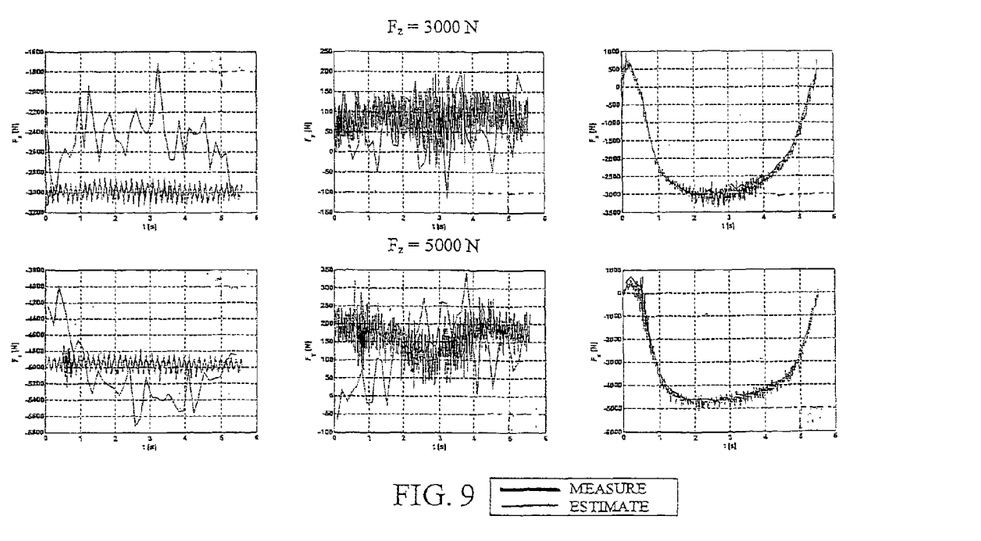
FIG. 9 shows the results obtained by the Applicant in an experimental test on the sample wheel of FIG. 2 with 0-10-0% sliding braking at 50 km/h, 3000 and 5000 N vertical load and zero drift and camber.

The data processed in the processing unit is then sent to a control unit of the dynamics of the vehicle (ABS, VDC, etc.), which uses the data received, as well as other data coming from the vehicle itself (for example yaw acceleration, etc.) to calculate the suitable and possible variations on the actuator members (for example brakes, suspension unit) in order to optimise the dynamic behavior of the vehicle (FIG. 5). The control unit can be mounted inside the vehicle or alternatively in a remote position with respect to the vehicle.

The data processed by the control unit can also be stored or sent telematically to a remote control station to carry out a diagnostic and/or statistical analysis of the wheel.

The actuation of the method of the present invention requires the presence of an electric power source for the deformation sensors (in the case of strain gauges) and for the processing and transmission of data. Such a power source, per sé conventional, can be mounted inside the wheel (in the case in which the wheel comprises possible devices that require an electric power supply, like strain gauges and processing unit of the control signal) or, alternatively, inside the vehicle (in the case in which deformation sensors are used that do not require an electric power supply and the processing unit of the control signal is provided inside the vehicle).

In the specific example illustrated in FIG. 2, the sensors used are strain gauges. They effectively measure the local deformations of the rim.

For the method of the present invention to be carried out correctly the interfering effects of the temperature upon the strain gauges must be taken into account.

As is known, the main effect of temperature upon strain gauges is the variation in resistivity of the material that constitutes the strain gauge grid. As well as this effect one must also consider the elongation of the conductors of the strain gauge. The dilating of the material on which the strain gauge is applied must also be considered.

The deformation applied on the grid is therefore the result of the difference between the deformation of the material on which the grid is stuck and that which it would have in the absence of external actions. This deformation thus causes a variation in the internal resistance of the strain gauge; such a variation in resistance is proportional to the apparent deformation due to the effect of heat.

It is important to remember that the temperature, as well as the "interfering" effect just discussed, also has a "modifying" effect since it changes the value of the piezoresistive component.

The Applicant has foreseen two ways of compensating the effects of temperature on the strain gauges.

A first way consists of using, as well as the strain gauge for measuring the deformations (that we shall call "active gauge" for the sake of simplicity), a strain gauge identical to the first (that we shall call "dummy gauge") but connected onto an adjacent side of a Wheatstone Bridge (so that the deformations measured by the two strain gauges are subtracted from each other) and mounted on a portion of the rim not subjected to any deformation but subjected to the same temperature as the active gauge.

Under this condition the thermal outputs of the two strain gauges are identical and, through their mutual positioning on adjacent sides of the measuring bridge, they are eliminated preserving just the actual deformation component measured by the active gauge.

The second method for compensating the effects of temperature consists of exploiting the self-compensating effect of strain gauges. This effect consists of ensuring that the difference in thermal dilation coefficients of material and strain gauge compensates for the variation in resistivity of the material that constitutes the grid of the strain gauge. The self-compensation is, however, linked to a particular material in the sense that each self-compensated strain gauge is necessarily dedicated to a determined (and therefore single) material.

As an alternative to strain gauges, other types of sensors can also be used that are capable of detecting the local deformations of the rim when subjected to a load.

For example, in an alternative embodiment of the method of the present invention, instead of the strain gauges membrane sensors based upon SAW technology are used. These are membranes that vibrate in a different way according to the voltage to which they are subjected. The membranes are made to vibrate by an external energy source that applies a signal at a determined frequency. The external source can be on the vehicle itself, so as to be easily supplied with power through the battery of the vehicle (since it is not on the rim there are thus no problems of power supply). The ways of vibrating and thus the type of waves emitted by the membrane is a function of the state of excitation to which the membrane itself has been subjected. The system that emits the signals is also capable of reading the reply signals (reply waves) and of interpreting them with the aim of translating such signals into deformations to which the membrane that has been made to vibrate is subjected. The positioning of the emitter/receiver system on the vehicle (for example on the suspension) allows it to be easily supplied with power and allows the reply signal to be obtained directly on the vehicle (in a position where there is no rolling, differently than on the rim). The transmitter/receiver system also comprises the control unit that processes the data so as to generate the command signal to be sent to the wheel.

In a further alternative embodiment sensors can be used that are made with the presence of materials that have variations in magnetic properties as the stresses to which they are subjected vary: the variation in magnetic properties is usually measured through a variation in inductance.

EXAMPLE

The Applicant has carried out a series of experimental tests to verify the reliability of the method of the present invention. The tests were carried out by mounting three strain gauges like in the sample wheel illustrated in FIG. 2, so as to measure the deformation of the rim by flexing $\epsilon_1$ in the plane perpendicular to the middle plane X-Z of the wheel, the circumferential deformation $\epsilon_2$ of the rim and the deformation of the rim by flexing $\epsilon_3$ in a plane parallel to the middle plane X-Z of the wheel.

In a first approximation it is hypothesised that the link between the deformations of the rim and the forces at the hub generated by the wheel-road contact forces is linear, that is:

$$\underline{F} = [A] \cdot \underline{\epsilon}$$

where $\underline{F}$ is the vector of the forces at the hub, $[A]$ is the correlation matrix and $\underline{\epsilon}$ is the vector of the deformations.

The vector of the forces was defined with the three force components Fx, Fy and Fz whereas that of the deformations was defined considering the deformation value of the spoke on which the strain gauge is mounted when it is at the footprint area, that is when such a spoke is at the wheel-road contact zone.

In this case the correlation matrix has a size of 3×3. Hereafter it is shown the calibration matrix identified in the following tests:

variation in vertical load from 2000 N to 6000 N at 50 km/h, with zero drift, sliding and camber;

sinusoidal drift variation (magnitude 2°, frequency 0.25 Hz) at 50 Km/h with 3000 and 5000 N vertical load, with zero sliding and camber;

sinusoidal variation in camber (magnitude 2°, frequency 0.25 Hz) at 50 Km/h with 3000 and 5000 N vertical load, with zero sliding and drift;

0-10-0% braking sliding at 50 km/h with 3000 and 5000 N vertical load, with zero drift and camber.

The matrix obtained is the following:

$$\begin{bmatrix} F_z \\ F_y \\ F_x \end{bmatrix} = 10^5 \cdot \begin{bmatrix} 0.8564 & -2.1741 & -0.0232 \\ -0.0788 & 1.2650 & 0.0381 \\ -0.0088 & 0.0084 & -0.3449 \end{bmatrix} \times \begin{bmatrix} \varepsilon_1(0°) \\ \varepsilon_2(0°) \\ \varepsilon_3(0°) \end{bmatrix}$$

FIGS. 6-9 show a comparison between the forces that are applied (measured) and those that are determined (estimated) according to the method of the present invention. It is clear that, with the aforementioned arrangement of the sensors, good results are obtained in the estimation of:

lateral force Fy with zero sliding and camber;

longitudinal force Fz with zero drift and camber.

The invention claimed is:

1. A method for determining the force at the hub of a wheel of a vehicle while traveling, said wheel comprising a rim and at least one deformation sensor directly associated with said rim in at least one predetermined position and arranged according to at least one predetermined orientation, comprising the steps of:

detecting at least one deformation component of said rim during travel through said at least one deformation sensor; and applying to said at least one deformation component, during travel, a correlation parameter characteristic of said rim, between the force at the hub and the relative deformation of said rim to determine at least one force component at the hub correlated with said at least one deformation component of said rim.

2. The method according to claim 1, wherein said correlation parameter is determined experimentally through the following steps:

a) providing a sample wheel having a rim which is substantially the same as the rim of said wheel; and b) determining, through experimental tests on said sample wheel, at least one correlation coefficient between at least one force component acting upon said sample wheel at the hub along at least one predetermined direction and at least one respective deformation component of the rim of said sample wheel.

3. The method according to claim 2, wherein the step of determining said at least one correlation coefficient comprises the steps of:

a1) setting said correlation coefficient at an initial value;

a2) applying at least one test parameter to said sample wheel;

a3) applying at least one force component acting upon the sample wheel at the hub along said at least one predetermined direction;

a4) detecting at least one deformation component of the rim of said sample wheel caused by said at least one force component;

a5) multiplying said at least one correlation coefficient and said at least one deformation component detected in step a4) to obtain at least one calculated force component;

a6) comparing said at least one force component calculated in step a5) with said at least one force component applied in step a3); and a7) iteratively repeating steps a5) and a6), each time correcting the value of said at least one correlation coefficient until said at least one force component calculated in step a5) assumes a value substantially equal, apart from a predetermined tolerance, to that of said at least one force component applied in step a3).

4. The method according to claim 3, wherein the correction of said at least one correlation coefficient takes place through an error minimization algorithm between said at least one force component calculated in step a5) and said at least one force component applied in step a3).

5. The method according to claim 1, wherein said at least one deformation sensor is associated with said rim in at least one zone of maximum deformation of said rim in a determined direction.

6. The method according to claim 1, wherein said at least one deformation sensor is a strain gauge.

7. The method according to claim 1, wherein said at least one deformation sensor is a membrane sensor.

8. The method according to claim 1, wherein said at least one deformation sensor is a sensor comprising materials that have variations in magnetic properties as the stresses to which they are subjected vary.

9. The method according to claim 1, wherein said wheel comprises at least three deformation sensors suitably positioned in different points of the rim of said wheel so as to detect during travel at least three local deformation components of the rim generated by the force acting at the wheel-road contact zone.

10. The method according to claim 9, wherein said wheel comprises four sensors.

11. The method according to claim 1, further comprising the steps of:

generating at least one control signal representing said at least one force component at the hub determined during travel;

processing said at least one control signal to determine data representing the dynamic conditions of the wheel during travel; and sending said data to a vehicle control unit.

12. The method according to claim 11, wherein processing said at least one control signal includes processing said control signal with a processing unit mounted on said wheel.

13. The method according to claim 11, wherein processing said at least one control signal includes processing said control signal with a processing unit mounted inside the vehicle.

14. The method according to claim 11, wherein sending said data to the vehicle control unit includes sending said data to a vehicle control unit mounted inside the vehicle.

15. The method according to claim 11, wherein sending said data to the vehicle control unit includes sending said data to a vehicle control unit mounted in a remote position with respect to said vehicle.

16. The method according to claim 11, further comprising the steps of:

processing said data in said vehicle control unit to generate a command signal representing the optimal dynamic conditions of said wheel during travel;

controlling the dynamic behavior of the vehicle by modifying at least one travel parameter applied to said wheel, based upon said command signal.

17. The method according to claim 1, further comprising providing power with a power source mounted inside the wheel.

18. The method according to claim 1, further comprising providing power with a power source mounted inside the vehicle.

19. The method according to claim 18, further comprising transmitting energy with a radio-frequency energy transmission system from said power source to said wheel.

20. The method according to claim 1, further comprising compensating for the effects of heat on said at least one deformation sensor.

21. A wheel for vehicles, comprising a rim and a pneumatic tyre mounted on said rim, wherein said wheel comprises at least one deformation sensor directly associated with said rim in at least one predetermined position and arranged according to at least one predetermined orientation, said at least one deformation sensor being operable to detect at least one deformation component of said rim during travel; and     a processing unit operable to process a control signal representing at least one force component at the hub, wherein the processing unit generates the control signal representing at least one force component of the hub at least in part by applying to said at least one deformation component, during travel, a correlation parameter characteristic of said rim, between the force at the hub and the relative deformation of said rim to determine at least one force component at the hub correlated with said at least one deformation component of said rim.

22. The wheel according to claim 21, wherein said at least one deformation sensor is associated with said rim at least one zone of maximum deformation of said rim in a determined direction.

23. The wheel according to claim 21, wherein said at least one deformation sensor is a strain gauge.

24. The wheel according to claim 21, wherein said at least one deformation sensor is a membrane sensor.

25. The wheel according to claim 21, wherein said at least one deformation sensor is a sensor comprising materials that have variations in magnetic properties as the stresses to which they are subjected vary.

26. The wheel according to claim 21, comprising at least three deformation sensors suitably positioned in different points of the rim of said wheel so as to detect, during travel, at least three local deformation components of the wheel generated by the force acting at the wheel-road contact zone.

27. The wheel according to claim 26, comprising four sensors.

28. The wheel according to claim 21, further comprising a processing unit of a control signal representing at least one force component at the hub.

29. The wheel according to claim 21, further comprising a power source.

* * * * *